United States Patent [19]

Broussely

[11] 4,448,864

[45] May 15, 1984

[54] LITHIUM - MANGANESE DIOXIDE CELL

[75] Inventor: Michel Broussely, Liguge, France

[73] Assignee: Societe Anonyme dite: GIPELEC, Levallois-Perret, France

[21] Appl. No.: 516,386

[22] Filed: Jul. 22, 1983

[30] Foreign Application Priority Data

Jul. 30, 1982 [FR] France ................................ 82 13324

[51] Int. Cl.³ ............................................. H01M 6/14
[52] U.S. Cl. .................................... 429/194; 429/199; 429/224
[58] Field of Search ................ 429/194, 197, 224, 199

[56] References Cited

U.S. PATENT DOCUMENTS 4,260,668  4/1981  Lecerf et al. ........................ 429/194
4,268,588  5/1981  Lecerf et al. ........................ 429/194

FOREIGN PATENT DOCUMENTS 2937285  3/1980  Fed. Rep. of Germany .

Primary Examiner—Charles F. LeFevour
Attorney, Agent, or Firm—Kenyon & Kenyon

[57] ABSTRACT

A lithium - manganese dioxide cell in which a certain quantity of copper oxyphosphate is added to the manganese dioxide to obtain a second discharge voltage plateau for use in detecting the end of cell life before it is too late.

5 Claims, 1 Drawing Figure

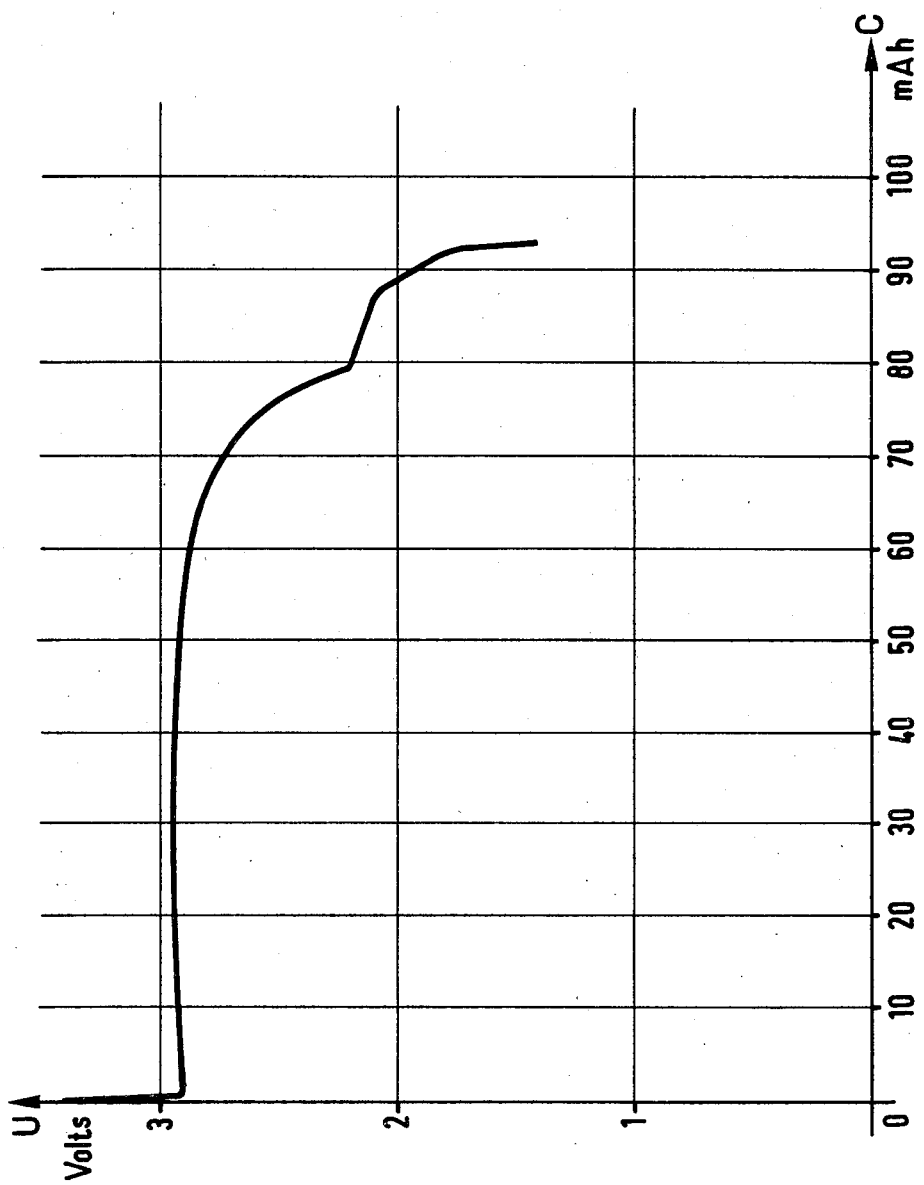

LITHIUM - MANGANESE DIOXIDE CELL

The present invention relates to a lithium-manganese dioxide cell. The advantageous feature of such a cell is its high discharge voltage, which is about 2.8 to 3 volts under slow discharge conditions. There are many applications for such cells, in particular as back-up power supplies for computer memory.

Preferred embodiments of the present invention enable the approach of the end of a cell's life to be detected in such a manner as to enable satisfactory cell replacement without interrupting operation of the system using the cell.

SUMMARY OF THE INVENTION

The present invention provides a lithium-manganese dioxide cell having an electolyte which includes a lithium salt dissolved in a solvent chosen from the group constituted by esters, ethers, and mixtures thereof, the improvement wherein the manganese dioxide is mixed with copper oxyphosphate $Cu_4O\,(PO_4)_2$ suitable for conferring a second voltage plateau on the cell discharge curve, the proportion by weight of the copper oxyphosphate being determined by the capacity required at said second discharge voltage plateau.

By way of example, said proportion may be about 10% by weight.

Thus, after the manganese dioxide has discharged at about 3 volts, a copper oxyphosphate discharge is obtained at a voltage which is substantially lower, but which is greater than 2 volts, at least under conditions of slow discharge.

Copper oxyphosphate is completely compatible with manganese dioxide and they are easily mixed since they are of similar density. Further, copper oxyphosphate is stable in organic electrolytes as used in Li-MnO$_2$ cells. By way of example: the ester may be chosen from the group constituted by polypropylene carbonate, ethylene carbonate, and their equivalents; the ether may be chosen from the group constituted by dimethyl ethers, dioxolane and their equivalents; and the lithium salt may be chosen from the group constituted by LiClO$_4$, LiBF$_4$, LiCF$_3$SO$_3$, LiAsF$_6$, etc.

BRIEF DESCRIPTION OF THE DRAWING

An embodiment of the invention is described by way of example with reference to the accompanying drawing in which the sole FIGURE is a discharge curve for a cell in accordance with the invention, with voltage U being plotted as a function of capacity C (in mAh).

MORE DETAILED DESCRIPTION

A cell in accordance with the invention was made as follows:
(1) Positive electrode:
  Manganese dioxide—278 mg
  Copper oxyphosphate—32 mg
  PTFE binder—14 mg
  Graphite electron conductor—32 mg
this mixture was compressed into the form of a disk 16.7 mm in diameter and 0.75 mm thick.
(2) negative electrode:
  lithium—25.5 mg
(3) electrolyte: a molar solution of lithium perchlorate in a mixture of polyproplyene carbonate and dimethoxyethene (mixed 50%—50% by volume).

These constituents were assembled in a conventional button cell having a diameter of 20 mm and a thickness of 2 mm.

The resulting cell was discharged at 20° C. through a constant resistance of 30 k.ohms, and the result plotted in the accompanying FIGURE.

In this example, it can be seen that the capacity of the second discharge plateau is about 100% of the total capacity, thereby giving plenty of warning for easy cell replacement under conditions of complete safety.

Naturally the invention is not limited to the embodiment described. The proportion of copper oxyphosphate may be modified, depending on the desired duration of the second voltage plateau.

It should nonetheless be observed, that although the theoretical capacity of copper oxyphosphate is 466 mAh/g, only two thirds of this capacity is usable at voltages greater than 2 volts.

A unit capacity of 310 mAh/g should therefore be used as a basis for calculation, which value is very close to the unit capacity of manganese dioxide (308 mAh/g). It is thus possible to assume that their relative weights are approximately equal to their relative capacities.

I claim:

1. A lithium-manganese dioxide cell having an electrolyte which includes a lithium salt dissolved in a solvent chosen from the group constituted by esters, ethers, and mixtures thereof, the improvement wherein the manganese dioxide is mixed with copper oxyphosphate suitable for conferring a second voltage plateau on the cell discharge curve, the proportion by weight of the copper oxyphosphate being determined by the capacity required at said second discharge voltage plateau.

2. A lithium cell according to claim 1, wherein the proportion of copper oxyphosphate is about 10% of the total weight of the positive active material.

3. A lithium cell according to claim 1 or claim 2, wherein said ester is chosen from the group constituted by polypropylene carbonate and ethylene carbonate.

4. A lithium cell according to claim 1 or claim 2, wherein said ether is chosen from the group constituted by dimethyl ethers and dioxolane.

5. A lithium cell according to claim 1 or claim 2, wherein said lithium salt is chosen from the group constituted by LiClO$_4$, LiBF$_4$, LiCF$_3$SO$_3$, and LiAsF$_6$.

* * * * *

UNITED STATES PATENT AND TRADEMARK OFFICE
CERTIFICATE OF CORRECTION

PATENT NO. : 4,448,864
DATED : 15 May 1984
INVENTOR(S) : Michel BROUSSELY

It is certified that error appears in the above—identified patent and that said Letters Patent is hereby corrected as shown below:

Column 2, line 18: "100%" should be --10%--.

Signed and Sealed this

Second Day of October 1984

[SEAL]

Attest:

Attesting Officer

GERALD J. MOSSINGHOFF

Commissioner of Patents and Trademarks